(12) United States Patent
Cannon et al.

(10) Patent No.: US 7,853,675 B2
(45) Date of Patent: Dec. 14, 2010

(54) AUTOMATICALLY ENFORCING CHANGE CONTROL IN OPERATIONS PERFORMED BY OPERATIONAL MANAGEMENT PRODUCTS

(75) Inventors: David Maxwell Cannon, Tucson, AZ (US); Michael Allen Kaczmarski, Tucson, AZ (US); Bernhard Julius Klingenberg, Morgan Hill, CA (US); David Gregory Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 11/681,400

(22) Filed: Mar. 2, 2007

(65) Prior Publication Data
US 2008/0215713 A1 Sep. 4, 2008

(51) Int. Cl.
*G06F 15/167* (2006.01)
(52) U.S. Cl. .................. 709/222; 709/203; 709/209; 709/229; 455/457; 455/567; 715/700
(58) Field of Classification Search .......... 709/203, 709/209; 455/457, 567; 715/700
See application file for complete search history.

(56) References Cited

U.S. PATENT DOCUMENTS

| | | | |
|---|---|---|---|
| 6,256,773 B1 | 7/2001 | Bowman-Amuah | |
| 6,363,421 B2 | 3/2002 | Barker et al. | |
| 6,370,573 B1 | 4/2002 | Bowman-Amuah | |
| 6,959,337 B2* | 10/2005 | McLaughlin et al. | 709/229 |
| 6,996,601 B1* | 2/2006 | Smith | 709/203 |
| 7,542,786 B2* | 6/2009 | Westwood et al. | 455/567 |
| 2009/0055735 A1* | 2/2009 | Zaleski et al. | 715/700 |

OTHER PUBLICATIONS

Joeris, Gregor, "Change Management Needs Integrated Process and Configuration Management", Proceedings of the 6th European Conference, held jointly with the 5th ACM SIGSOFT International Symposium on Foundations of Software Engineering, vol. 22, No. 6, Nov. 1997, pp. 125-141.
Nguyen et al., "An Infrastructure for Development of Object-Oriented, Multi-level Configuration Management Services", ICSE '05, May 15-21, 2005, pp. 215-224.
Estublier et al., "Impact of Software Engineering Research on the Practice of Software Configuration Management", ACM Transactions on Software Engineering and Methodology, vol. 14, No. 4, Oct. 2005, pp. 383-430.
Conradi et al., "Version Models for Software Configuration Management", ACM Computing Surveys, vol. 30, No. 2, Jun. 1998, pp. 232-282.

* cited by examiner

*Primary Examiner*—Tammy T Nguyen
(74) *Attorney, Agent, or Firm*—Stephen J. Walder, Jr.; Feb R. Cabrasawan

(57) ABSTRACT

Mechanisms for enforcing change control in operations performed by operational management products (OMPs) are provided. The mechanisms automate the checking of a request-for-change (RFC) state by an OMP when the OMP is installed in an environment where a change management database (CMDB) has been installed and certain resources or operations have been placed under strict change control. The OMPs of the illustrative embodiments require an RFC identifier to be specified when a change operation of the OMP is invoked. The RFC identifier is used by the OMP to access a service management system so that the OMP may determine if the RFC identifier is valid, IT resources are in the correct state, and the change is scheduled to be performed at the current time. If these checks are passed, then the change operation associated with the RFC is permitted to occur.

12 Claims, 4 Drawing Sheets

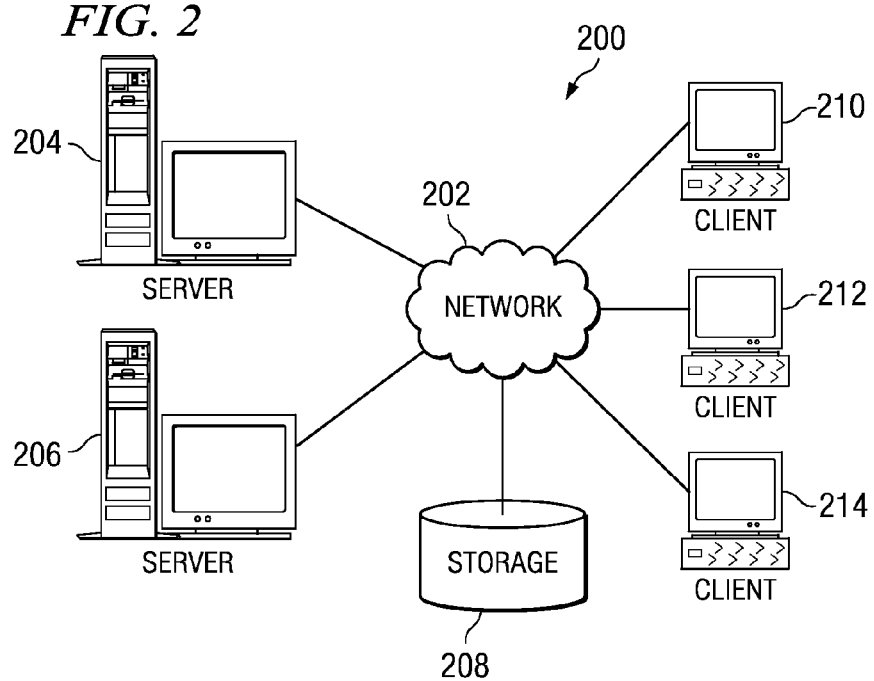
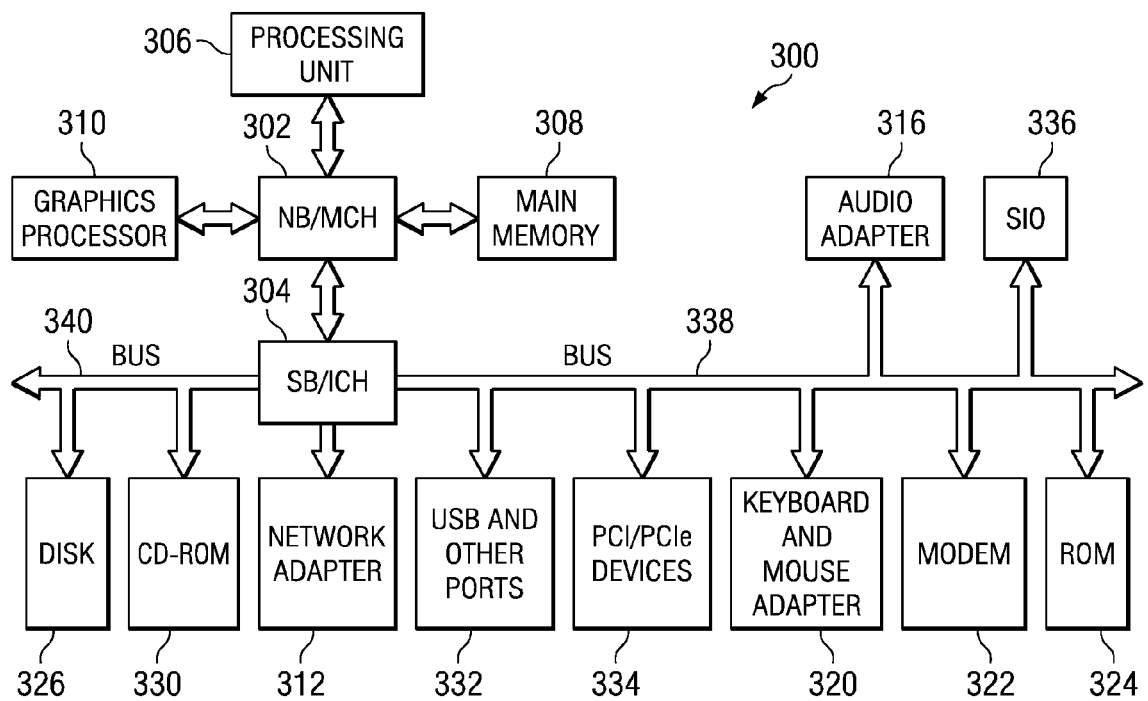

AUTOMATICALLY ENFORCING CHANGE CONTROL IN OPERATIONS PERFORMED BY OPERATIONAL MANAGEMENT PRODUCTS

BACKGROUND

1. Technical Field

The present application relates generally to an improved data processing system and method. More specifically, the present application is directed to a system and method for automatically enforcing change control in operations performed by operational management products.

2. Description of Related Art

As Information Technology (IT) organizations try to streamline their business processes to control costs, many organizations look to the best practices that have been established by the United Kingdom's Information Technology Infrastructure Library (ITIL) or other best practices that suggest how processes should be structured and used. ITIL is a framework of best practice approaches intended to facilitate the delivery of high-quality information technology services.

ITIL consists of a series of books giving guidance on the provisioning of quality IT services, and on the accommodation and environmental facilities needed to support IT. ITIL has been developed in recognition of the growing dependency on IT and embodies best practices for IT Service Management. The ethos behind the development of ITIL is the recognition that organizations are becoming increasingly dependent on IT in order to satisfy their corporate aims and meet their business needs. This leads to an increased requirement for high-quality IT services.

A fundamental tenant of best practices, such as set forth in the ITIL, is configuration management, i.e. a process that tracks all of the individual configuration items (CIs) in a system. A configuration management database (CMDB) is used as a unified or federated repository of all of the components, i.e. configuration items, of an information system, and is utilized by the configuration management practice.

The IBM Service Management solution, available from International Business Machines Corporation of Armonk, N.Y., is an implementation of process management that is integrated with the CMDB and operational management products. IBM Service Management provides a comprehensive and scalable solution that can enable deployment, maintenance, and management, of IT resources. The ITIL has been used as a guideline for developing the base processes of the IBM Service Management solution. These base processes can easily be modified by users to match the manner in which they wish to run their business using the IBM Service Management solution.

IBM Service Management includes a change and configuration management database (CCMDB) implementing change management processes with an integrated change management database (CMDB). The CMDB is populated with IT resource configuration information through direct discovery of the configuration information via sensors that collect information from the network and computer systems. Moreover, this IT resource configuration information may be obtained through discovery library adapters that load information into the CMDB from other operational management products (OMPs), such as network management tools, software distribution tools, inventory tools, and storage management tools.

FIG. 1 is an exemplary diagram illustrating an architecture of the IBM Service Management solution. As shown in FIG. 1, the architecture is comprised of a process runtime environment 110, a data subsystem 130, operational management products (OMPs) 140, a set of policies 160, and a set of integrated user interfaces 170. The architecture works in conjunction with IT infrastructure, transactions, users, and business processes 150. The process runtime environment 110 supports a number of process flows 112-118 for providing services in different disciplines including configuration and change management 112, release management 114, availability management 116, and storage management 118.

The data subsystem 130 contains a discovery library 132, a data synchronization and federation engine 134, a reconciliation engine 136 for data cleansing and normalization, and a change management database (CMDB) 138. The CMDB 138 is populated through the techniques described above, i.e. via the discovery library 132 and discovery library adapters provided by the operational management products (OMPs) 140, and the various services or tools provided in the process runtime environment 110. The integrated user interfaces 170 are used to interact with and administer process steps in the process management services 112-118, sometimes launching functions from the salient operational management products (OMPs) 140. The policies 160 are used to guide execution of the process steps based on the severity of the change or other salient attributes as defined by the process developer or administrator.

Individual process steps in the process management services 112-118 may interact with the OMPs 140 via system integration modules (SIMs) 120, e.g., Web service calls that perform a management function through a management product automatically, or through user driven techniques, such as launch in context, to bring up a management product's user interface when a specific operation needs to be done in the context of a process.

A request-for-change (RFC) is an artifact that is used to track and operate on a request to change or adjust one or more resources (configuration items or CIs) of an IT infrastructure 150 and is a central part of the change control process. For example, a RFC may be generated by a user of the IT infrastructure 150, an administrator of the IT infrastructure 150, or the like, to make changes that resolve problems with the IT infrastructure 150. The RFC may specify the changes that are desired in the IT infrastructure 150, e.g., the configuration items (CIs), and records the changes that are necessary to achieve the desired change to the IT infrastructure 150.

For systems that are under change control, i.e. a system in which changes to the infrastructure, or CIs, must first be approved and scheduled by a control authority, the RFC is used by administrators and analysts to determine the impact that the change will have. The administrators and/or analysts may, based on the determined impact to the IT infrastructure 150, approve or disapprove the change. If the administrators and/or analysts approve the change, the administrators and/or analysts may then reference the RFC in the processes that are scheduled to guide the operations that must be performed. Effective change control is important for critical IT systems because outages in business services can often be traced to improper changes in configuration of the IT infrastructure 150, e.g., CIs.

The OMPs 140 are services that may automate tasks to address application or business service operational management challenges. These products help optimize the performance and availability of business-critical applications along with the supporting IT infrastructure 150. The OMPs 140 may further be used to configure specific CIs in the IT infrastructure 150 and monitor their usage.

With particular relevance to the illustrative embodiments of the present invention described hereafter, one or more OMPs 140 may be used to change the configuration of an IT resource, in the IT infrastructure 150, once a human administrator and/or analyst has approved the change to the IT resource, via approval of the corresponding RFC. For resources under strict change control, the subject matter expert that is using the OMP 140 may have to ensure that the change being performed is related to a valid RFC that has been approved by an appropriate human authority, and that the current status of the system is at a correct state for the change to be made, e.g., the change to the IT resource is scheduled to occur at the time that the change is actually being made. If the change is not performed correctly in this manner, then the change management process may fail and outages may occur.

Since RFC checking when working with an OMP is a manual process, it may be subject to mistakes when misunderstandings occur. As a result, inappropriate changes may occur and system outages may occur. In other words, the RFC checking functionality is subject to human error.

SUMMARY

The illustrative embodiments provide a system and method for enforcing change control in operations performed by operational management products (OMPs). The illustrative embodiments automate the checking of a request-for-change (RFC) state by an OMP when the OMP is installed in an environment where a change management database (CMDB) has been installed and certain resources or operations have been placed under change control.

With the illustrated embodiments, an OMP, the CMDB, or the like, provides configuration information for specifying which resources and/or operations are to be placed under change control. The OMP, CMDB, or the like, further provides configuration information for automated access to service management system interfaces that may be used to verify the RFC. The OMPs of the illustrative embodiments require an RFC identifier to be specified by a user, or passed to the OMPs as a parameter by the system integration module (SIM) when a change operation of the OMP is invoked. The RFC identifier is used by the OMP to access a service management system in order to perform an RFC authorization operation. In particular, the accessing of the service management system may allow the OMP to determine if the RFC identifier is valid, IT resources are in the correct state, and the change is scheduled to be performed at the current time. If these checks are passed, then the change to the IT resource, or more specifically, the configuration item (CI) that represents the IT resource, associated with the RFC and the change operation is permitted to occur.

If these checks are not passed, the OMP may check its configuration information to automatically identify and perform an operation in response to a failure of the change operation authorization. For example, the change operation may automatically be allowed to occur even if the change operation authorization fails but an appropriate message may be issued to appropriate personnel, the change operation may automatically be denied and appropriate messages may be issued to appropriate personnel, or a process in the service management system may be invoked to perform remediation.

As a further example, in response to a change operation authorization failure, the OMP may automatically use process manager interfaces to open a new RFC for the change and then return without performing the change but indicating to a user, such as an IT administrator, that a new RFC was created. The user may then wait for notification that the new RFC has been approved before retrying the operation.

The automated change operation authorization of the OMPs may be configurable such that the extent to which the automated change operation authorization is used, and the functions performed in the event of a change operation authorization failure, may be customized. For example, the OMPs may be configured to the comfort level of the user (IT administrator) and/or the IT infrastructure and the particular functionalities enabled by the IT infrastructure. For example, if the IT infrastructure environment does not contain a CMDB or change control is not being utilized through the CMDB process managers, the automated change operation authorization of the OMPs may be disabled such that the other functions of the OMP are still useable.

In one illustrative embodiment, a method for performing automated change control on one or more data processing system resources is provided. The method may comprise receiving a change operation command specifying an operation for changing a configuration of a resource in a data processing system, automatically determining if one of the change operation or the resource is under strict change control, and automatically performing a request-for-change (RFC) validation check on the change operation command if the change operation or the resource is under strict change control. A change operation corresponding to the change operation command may be automatically performed to thereby change the configuration of the resource if the results of the RFC validation check indicate that the change operation should be permitted. The change operation command may include a RFC identifier for an RFC corresponding to the change operation command.

Automatically performing a RFC validation check may comprise performing a lookup operation in a service management system based on the RFC and determining if current conditions meet requirements of the RFC for performance of the change operation. Determining if current conditions meet requirements of the RFC for performance of the change operation may comprise at least one of determining if the RFC is valid, determining if a current date and time match a scheduled date and time associated with the RFC, or determining if a state of the data processing system is such that the resource may be modified by the change operation.

The method may further comprise automatically performing error processing on the change operation command if the RFC validation check on the change operation command fails. Automatically performing error processing on the change operation command may comprise determining which error processing to perform based on the requested change operation and an identification of the resource. Moreover, the error processing may comprise one of (1) denying the change operation and issuing at least one message to one or more data processing devices of the data processing system indicating a check failure; (2) permitting the change operation to be performed and issuing at least one message to one or more data processing devices of the data processing system indicating the check failure and indicating that the change operation was permitted; or (3) submitting an incident report, identifying a problem encountered, to a user and automatically performing a re-check of the RFC validation in response to the user responding with an input indicating the problem to be resolved.

Furthermore, the error processing may comprise utilizing an interface to a process manager of the data processing system to automatically open a new RFC for the change operation. The error processing may also comprise sending a notification message to a data processing device of the data processing system indicating that the original change operation command could not be completed but that a new RFC was created for the change operation. The notification message may include a new RFC identifier.

Automatically determining if one of the change operation or the resource is under strict change control may comprise obtaining configuration information for the data processing system from a configuration management database (CMDB). The configuration information may specify at least one of which change operations or resources are under strict change control. Automatically determining if one of the change operation or the resource is under strict change control may further comprise determining if one of the change operation or the resource is under strict change control based on the configuration information from the CMDB.

The change operation may be performed on a configuration item in a configuration management database. The configuration item may represent the resource in the data processing system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an exemplary diagram depicting an exemplary distributed data processing system in which aspects of the illustrative embodiments may be implemented;

FIG. 3 is a block diagram of an exemplary data processing system in which aspects of the illustrative embodiments may be implemented;

DETAILED DESCRIPTION OF THE ILLUSTRATIVE EMBODIMENTS

Figure 1:
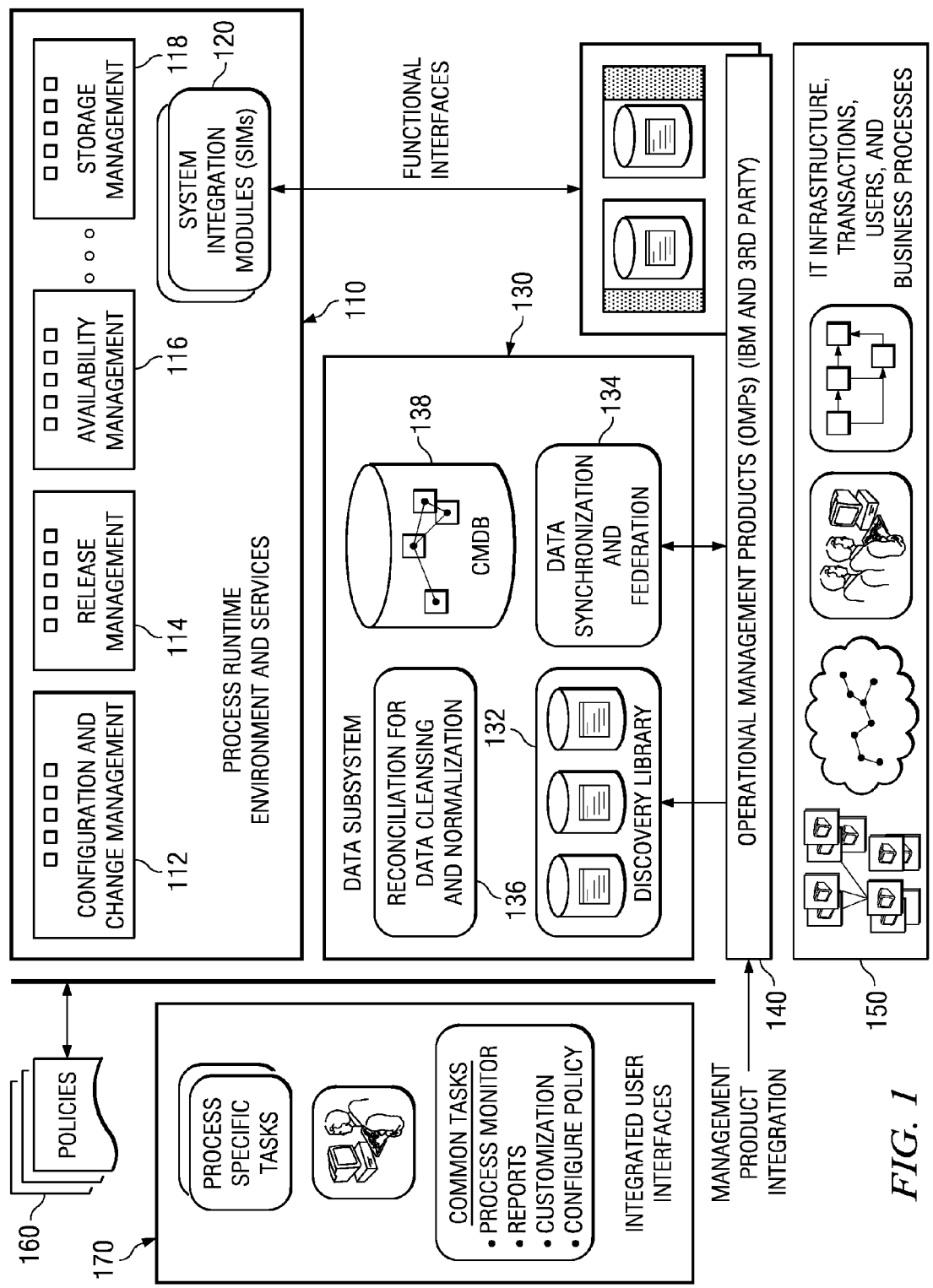
FIG. 1 is an exemplary diagram illustrating an architecture of the IBM Service Management solution.

The illustrative embodiments provide a system and method for performing automated change control management in operations performed by operational management products (OMPs) of an information technology (IT) infrastructure, such as an IBM Service Management infrastructure available from International Business Machines Corporation of Armonk, N.Y. As such, the illustrative embodiments are especially well suited for implementation in a distributed data processing environment in which a plurality of computing devices communicate with one another via one or more data networks. Thus, in order to provide a context in which to understand the specific components and operations of the illustrative embodiments as described hereafter, a brief description of an example distributed data processing system, and computing devices which may be utilized in such a distributed data processing system, will first be provided with reference to FIGS. 2-3. It should be appreciated that FIGS. 2-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 2 depicts an exemplary distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an exemplary data processing system is shown in which aspects of the illustrative embodiments may be implemented. Data processing system 300 is an example of a computer, such as clients 210-214 or servers 204-206 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

With the illustrative embodiments, a change control management system for an information technology (IT) infrastructure of an organization may be provided via one or more of the servers 204-206 and network attached storage 208. For example, the servers 204-206 may provide a process runtime environment in which configuration and change management, release management, availability management, storage management, and other process management services may be provided. Moreover, the servers 204-206 may provide one or more operational management products (OMPs), in accordance with the illustrative embodiments, which automatically perform change operation authorization functions. Users may access the process management services and the OMPs via their client devices 210-214 and user interfaces provided by the OMPs, for example.

The network attached storage 208 may provide a data subsystem for the IT infrastructure of an organization. Thus, the network attached storage 208 may provide a change management database (CMDB) in accordance with the illustrative embodiments, as described hereafter. Moreover the network attached storage 208 may provide an OMP database and storage for OMP configuration information for controlling the operation of the OMPs with regard to their automated change operation authorization functionality.

With the illustrative embodiments, an OMP, a service management system, or the like, provides configuration information for specifying which resources and/or operations are to be placed under change control. The OMP is provided with configuration information for automated access to the service management system interfaces that can be used to verify the RFC. The OMPs of the illustrative embodiments require an RFC identifier to be specified by a user, or passed to the OMPs as a parameter by the system integration module (SIM) when a change operation of the OMP is invoked. The RFC identifier is used by the OMP to access the service management system to perform an RFC authorization operation. In particular, the accessing of the service management system may allow the OMP to determine if the RFC identifier is valid, IT resources are in the correct state, and the change is scheduled to be performed at the current time. If these checks are passed, then the change to the IT resource associated with the RFC and the change operation is permitted to occur.

If these checks are not passed, the OMP may check its configuration information to automatically identify and perform an operation in response to a failure of the change operation authorization. For example, the change operation may automatically be allowed to occur even if the change operation authorization fails but an appropriate message may be issued to appropriate personnel, the change operation may automatically be denied and appropriate messages may be issued to appropriate personnel, or a process in the service management system may be invoked to perform remediation. As a further example, in response to a change operation authorization failure, the OMP may automatically use process manager interfaces to open a new RFC for the change and then return without performing the change and indicating to the administrator that a new RFC was created. The user may then wait for notification that the new RFC has been approved before retrying the operation.

The automated change operation authorization of the OMPs may be configurable such that the extent to which the automated change operation authorization is used and the functions performed in the event of a change operation authorization failure may be customized to the comfort level of the administrator and/or the IT infrastructure and the particular functionalities enabled by the IT infrastructure. For example, if the IT infrastructure environment does not contain a CMDB or change control is not being utilized through the CMDB process managers, the automated change operation authorization of the OMPs may be disabled such that the other functions of the OMP are still useable.

Figure 4:
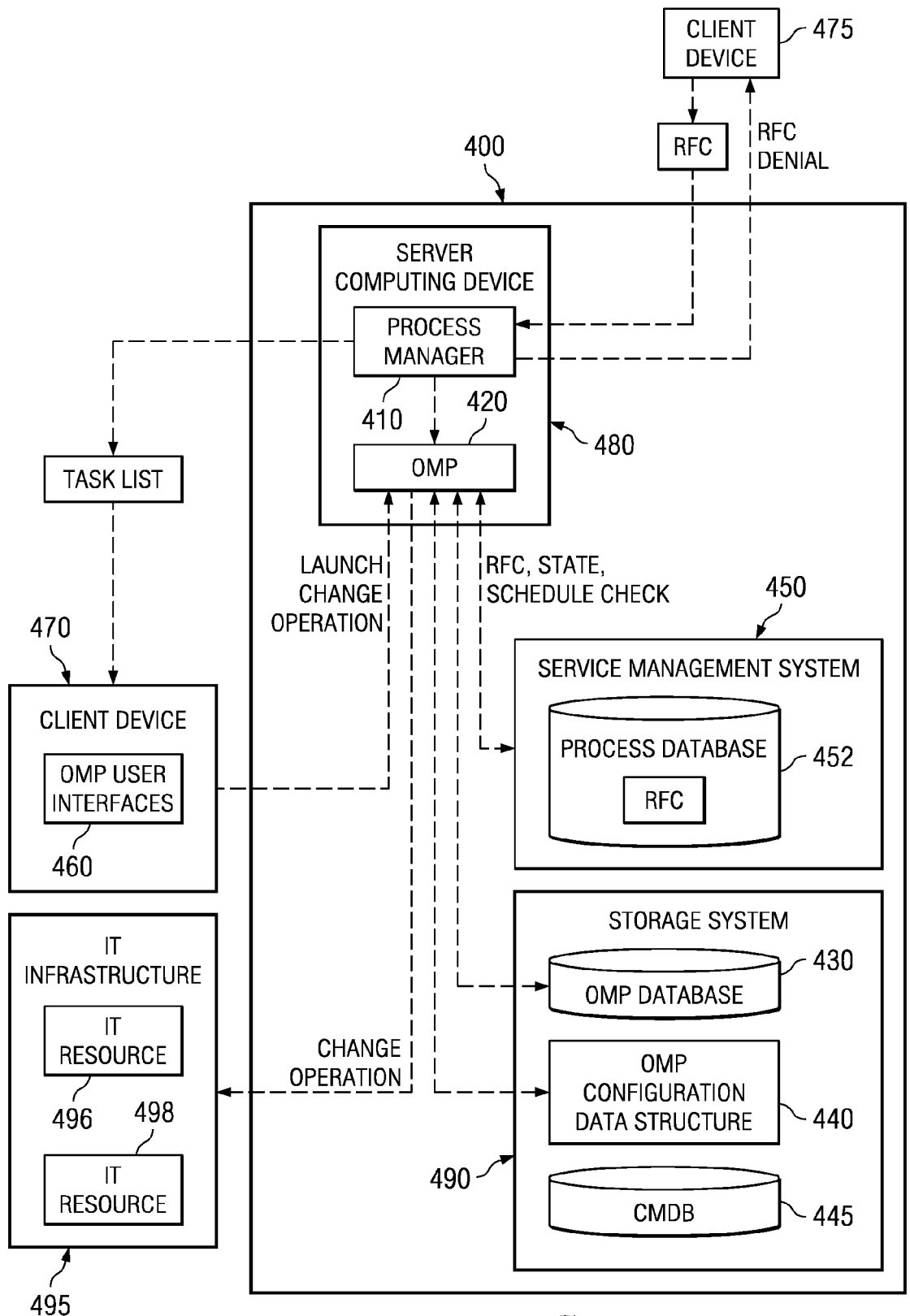
FIG. 4 is an exemplary block diagram of the primary operational components of an automated change control management system in accordance with one illustrative embodiment.

FIG. 4 is an exemplary block diagram of the primary operational components of an automated change control management system in accordance with one illustrative embodiment. The operational components shown in FIG. 4 may be implemented in hardware, software, or any combination of hardware and software. In a preferred embodiment, operational components shown in FIG. 4 are implemented as software instructions executed by one or more processors of one or more data processing devices.

As shown in FIG. 4, the automated change control management system 400 includes a process manager 410, an operational management product (OMP) 420, a service management system 450, and a storage system 490. The storage system 490 includes an OMP database 430, an OMP configuration data structure storage 440, and a change management database (CMDB) 445. The OMP database 430 stores data that is needed to manage the IT resources in its domain (e.g., computer systems, network devices, software packages, etc.). The storage system 490 may be either integrated or directly attached to the server computing device 480, or in a network attached storage device, such as storage unit 208 in FIG. 2. The service management system 450 includes a process database 452 in which a request-for-change (RFC) may be provided. One or more OMP user interfaces 460 may be provided by the OMP 420 which are accessible via a client device 470 in order to perform change operations in accordance with the illustrative embodiments.

The process manager 410 and OMP 420 may be provided in a server computing device 480, such as server 204 or 206 in FIG. 2 for example. The process manager 410 may be provided as a service in a process runtime environment, such as process runtime environment 110 in FIG. 1. The process manager 410 may submit change process requests for modifying IT resources, or more specifically, configuration items (CIs) representing the IT resources, in an IT infrastructure to the OMP 420. With regard to the illustrative embodiments herein, however, the process manager 410 is configured to identify a request-for-change (RFC) associated with the change process request for use in automated checking of the RFC by the OMP 420 before authorizing the change process request to be performed. Moreover, the OMP 420 is configured to accept an RFC identifier along with a change process request and perform automated checking of the RFC to ensure that the change process request can be performed in accordance with the RFC and the scheduling associated with the RFC.

The RFC itself may be submitted manually (the usual case) or automatically in response to an automated action that is taken to correct a problem in the IT infrastructure. Approval of the RFC may also be performed in a manual manner (the usual case) in which a group of people responsible for the proper functioning of the IT environment assess the possible impact of the change and determine when and if it should be performed. Alternatively, an automated mechanism may be established for analyzing the IT infrastructure, dependencies of IT resources, and the like, in order to determine the possible impact of a RFC and apply decision rules for determining whether an RFC should be automatically approved or be submitted to the group of persons responsible for the IT environment for review.

Initially, an IT administrator, analyst, or the like, configures the OMP 420 such that the OMP 420 is aware of the change control policy in place for the IT infrastructure and how to check this change control policy. For example, the system administrator may configure the OMP 420 by specifying which change operations and/or IT resources are to be placed under strict change control, i.e. which IT resources require an RFC to be submitted, approved, and changes to IT resources scheduled. Moreover, the system administrator may specify the network address and salient credentials for the OMP 420 to access the service management system 450. Furthermore, the system administrator may configure the OMP 420 to identify which actions should be taken when an attempted change to an IT resource fails because the RFC is not specified or is invalid, if the IT infrastructure 495 is currently in an incorrect state, or if the timing of the attempted change does not meet the established schedule for the IT resource change. The configuration information for the OMP 420 may be stored in the OMP configuration data structure 440 and may be utilized by the OMP 420 when making determinations as to whether change operation commands should be permitted to be processed, as discussed hereafter.

The configuring of the OMP 420 may be performed via one or more OMP user interfaces 460 provided to the system administrator, or the like, via an administrator workstation for example, such as client device 470. The OMP user interfaces 460 may provide a graphical user interface through which a user may specify entries into fields, select options from menus, or use any other known user interface element to specify the configuration options noted above. Various acceptable inputs may be pre-established and provided to the system administrator, or other user, for selection or free form fields may be provided for the user to enter the information. Any type of user interface for entry of the information for configuring the OMP 420 is considered to be within the spirit and scope of the present invention.

When a user wishes to make a change to an IT infrastructure 495, the user must submit a request-for-change (RFC) to the process manager 410, such as via a client device 475 or another client device coupled to the server computing device 480 via one or more data networks, direct connection, or the like. The RFC is a form that the user fills out and submits that indicates the details of the particular change that the user would like made to the IT infrastructure. The RFC, for example, may be a change request for adding storage to a file space on a particular host system of the IT infrastructure 495 or any other change to the configuration of the IT infrastructure 495. The RFC is submitted to the process manager 410 directly or via the OMP 420, or another OMP used for RFC submissions, and may be stored in the service management system 450, such as in process database 452. This RFC will then be used to track any changes made to the IT infrastructure in association with the RFC.

The process manager 410 may provide the RFC to a system administrator, analyst, or other authorized person for review and approval. Alternatively, the process manager 410 may be provided with a knowledge base for analyzing an RFC and determining the impact of the requested change on the IT resources to determine if the RFC should be approved, denied, or passed to a human administrator, analyst, etc., for review prior to approval or denial. Whether an automated review or a manual review of the RFC is performed, the process manager 410 may communicate the approval or denial of the RFC to the OMP 420 which then updates the RFC to indicate whether the RFC is approved or denied. Moreover, if the RFC is denied, a response may be sent to the originator of the RFC to indicate the denial and optionally, the reasons for the denial.

Assuming the RFC is approved, in addition to the approval indication, the administrator, analyst, or even the process manager 410 itself, may schedule the performance of the changes to IT resources in accordance with the approved RFC and communicate the schedule to the OMP 420. The schedule of IT resource changes may indicate dates and/or times when various changes to IT resources required to complete the requested change of the RFC may be performed. This schedule of IT resource changes may be stored in association, or as part of, the RFC in the service management system 450 along with the indication that the RFC has been approved.

In one embodiment, the process manager 410 may provide a list of tasks to be performed to the client device 470 based on received RFCs that have been approved. The list of tasks indicates changes to the IT infrastructure 495 (e.g., the salient configuration items) that need to be performed. These changes may indicate a schedule by which the changes to particular IT resources should be made, or more specifically, the configuration items (CIs) in the IT infrastructure 495 that represent the IT resources, e.g., IT resources 496 and 498. However, since the client device 470 is under human control, there are no guarantees that the schedule specified in the list of tasks will be strictly followed. Therefore, the OMP 420 of the illustrative embodiments includes functionality for ensuring strict adherence to the schedule, RFC approval, and IT infrastructure state requirements of an RFC.

At some later time, a user of a client device, such as an IT administrator using client device 470 or another client device coupled to the server computing device 480, may launch a change operation for changing the configuration of an IT resource 496-498 by sending a change operation command to the OMP 420. This change operation command may be submitted, for example, based on a list of tasks provided to the user of the client device 470 by the process manager 410. In accordance with the illustrative embodiments, such a change operation command contains fields for specifying an RFC identifier associated with the change command, if any, the change operation that is to be performed, the IT resource(s) 496-498 that are to be modified, and the like. The change operation command is provided to the OMP 420 for processing.

The OMP 420 parses the change operation command and first determines if the IT resource(s) 496-498 that are subject to the change operation command are resources that are under strict change control or the operation to be performed is under strict change control. If neither the IT resources 496-498 nor operation are under strict change control, then a check of the RFC, if any, is not necessary and the change operation is permitted to occur. If either the IT resources 496-498 or operation are under strict change control then an RFC check, along with an IT infrastructure/resource state check and schedule check are required before permitting the change operation command to be processed in the IT infrastructure 495. The determination of whether or not IT resources 496-498 or the operation is under strict change control may be performed based on a lookup operation of information stored in the CMDB 445 of the storage system 490 or information stored in the service management system 450, for example.

Assuming that the IT resources 496-498 that are subject to the change operation or the operation itself is under strict change control, the OMP 420 checks the RFC identifier provided in the change operation command to determine if this is a currently valid RFC, i.e. the RFC identifier corresponds to an RFC that was approved and is still active and not completed. The check of the RFC identifier may be performed by performing a lookup operation in the service management system 450, e.g., in a process database 452 maintained by the service management system 450, for an RFC corresponding to the RFC identifier and determining the current state of the RFC, i.e. accepted, denied, active, completed or closed, or the like. It should be noted that if the change operation command does not specify a RFC identifier and the IT resources 496-498 subject to the change operation or the operation itself is under strict change control, then the change operation command may be denied without having to perform the RFC lookup operation.

Based on the RFC lookup operation, a determination may be made as to whether the RFC identifier provided in the change operation command corresponds to an approved RFC that has not been completed or closed. If the RFC identifier in the change operation command is associated with an approved RFC that has not been completed or closed, a further check of the state of the IT resources 496-498 and the scheduling of the operation may be performed. The check of the state of the IT resources 496-498 may be performed by obtaining information from the IT infrastructure 495 indicating the current state of the IT resource 496-498, e.g., the IT resource 496 is still operational, is not currently in a busy state, etc. If the IT resource 496-498 is not currently in a state where the change operation can be performed without causing a problem with the IT infrastructure 495, the change operation may be denied. If the state of the IT resource 496-498 is appropriate for the change operation to be performed, then a check of the scheduling of the change operation may be performed.

The check of the scheduling of the operation may be performed by looking up the schedule in the corresponding RFC in the service management system 450 found during the RFC lookup operation. The schedule established by the process manager 410 may be stored in the RFC, or elsewhere in the service management system 450, and may identify when particular IT resources 496-498 may be changed in association with the RFC, e.g., only after midnight, on a weekend day at a particular time, etc. The current date, time, day, etc., may be checked against this schedule to determine if the change operation may be performed at the current time, date, etc. in accordance with the established schedule of the RFC.

If the RFC identifier of the change operation command corresponds to a valid RFC, i.e. a RFC that has been approved and is currently not completed or closed, and the state of the IT resources 496-498 are in an appropriate state for the change operation to occur, and the scheduling of the RFC corresponds to the current time, date, etc., then the change operation is permitted to continue to the IT infrastructure 495 where the configuration of the IT resources 496-498 subject to the change operation is modified. Such modifications may be performed to the configuration items (CIs) of the IT infrastructure 495 that represent the actual physical IT resources 496-498 rather than to the physical IT resources 496-498 themselves. These CIs may be maintained in the CMDB 445 of the storage system 490, for example.

Messages may be logged associating the RFC identifier with the change operation. These messages may be logged in the RFC itself, or in the OMP database 430 or the service management system 450, for example.

If the RFC identifier corresponds to an RFC that has been denied, has been completed, or is closed, or if any of the state and schedule checks are not passed, various operations may be performed in accordance with the configuration information stored in the OMP configuration data structure 440. Which operation to perform may be determined, for example, based on the nature of the operation being performed and the IT resources 496-498 that are subject to the change operation. The OMP 420 may be provided with logic for making such a determination based on the requested change operation and the identification of the IT resources 496-498 in the change operation command.

As one exemplary alternative, the change operation may be denied and appropriate messages may be issued to appropriate workstations, client devices, or the like, e.g., client device 470. This may be a default case in which, unless otherwise indicated in the configuration information in the OMP configuration data structure 440, the OMP 420 may implement this exemplary set of operations for change operation commands that fail one or more of the checks discussed above.

In another exemplary alternative, the change operation may be permitted to continue even in the presence of a RFC, state, or schedule check failure but appropriate messages may be generated and transmitted to appropriate workstations, client devices, or the like, e.g., client device 470, indicating the check failure and the fact that the change operation was permitted to continue. This may be done, for example, in order to provide the IT administrator for an agreeable level of comfort with regard to controlling changes to the IT infrastructure 495 before using stronger change control enforcement via the mechanisms of the illustrative embodiments. As another example, certain changes to IT resources 496-498 may have little likelihood of causing a failure of the IT infrastructure 495 or loss of availability of the IT resources 496-498. For such changes, the change operation may be permitted to continue but with notification messages sent.

In a further exemplary alternative, a remediation process in the service management system 450 may be invoked in response to the failure of one or more of the checks discussed above. As one example, the service management system 450 may submit an incident report to a human IT administrator or user. The human IT administrator may then correct the problem associated with the incident and instruct the service management system 450 to return a message to the OMP 420 indicating that the problem has been corrected. At this point, the OMP 420 may perform a re-check of the RFC identifier, state, and schedule associated with the RFC of the change operation. If all of these checks succeed, the change operation may then be permitted to continue. In this way, a human IT administrator may correct any problems with the attempted change operation and then retry the change operation after having corrected the problems.

As yet a further example alternative, the OMP 420 may utilize process manager 410 interfaces to automatically open a new RFC for the change and then return without performing the original change operation. A notification message may then be sent to an appropriate workstation, client device, etc. indicating that the original change operation command could not be completed but that a new RFC was created for the change operation command. The notification preferably provides the new RFC identifier so that the user may monitor the approval/denial of the new RFC. The user may then wait for a notification that the RFC had been approved before retrying the change operation. Thus, RFCs may be automatically generated by the OMP 420 in the event of a failure of a change operation command.

It should be appreciated that while the illustrative embodiments are described herein in terms of checking the RFC approval, IT infrastructure state, and schedule when determining whether to allow a change operation to be performed, the illustrative embodiments are not limited to such. Rather, the mechanisms of the illustrative embodiments may check any conditions stipulated in a RFC before permitting a change operation to modify the configuration items (CIs) representing an IT resource 496-498 of an IT infrastructure 495. For example, a RFC may specify that the change operation not be performed if certain other operations are running or that the change operation can only be performed if the other operation is running. As another example, the RFC may specify that the change operation can only be performed after changes specified in other RFCs have been completed.

As a further example, the RFC may stipulate that only certain administrators/users are permitted to initiate the change operation. These administrators/users could be a subset of those administrators/users normally authorized to perform the change operation. This may be useful in situations where the administrators/users are aware of special circumstances pertaining to a RFC. Any conditions under which a change operation should be allowed to be performed or should be denied may be specified in an RFC and checked by the mechanisms of the illustrative embodiments before permitting a change operation to continue.

Thus, the illustrative embodiments provide a mechanism for automating the checking of RFC identifiers, IT infrastructure state, and RFC scheduling, for resources or operations under strict change control or any other salient conditions or attributes, to ensure that a change operation may be performed in accordance with a valid RFC. The illustrative embodiments aid in removing the human error aspect of making such checks by providing an automated mechanism that prevents change operations from occurring unless these checks are satisfied.

It should be noted that, in many cases, an OMP 420 may be installed in environments where the CMDB 445 has not been installed or change control is not being used. Moreover, the OMP 420 may be installed in an environment where the system administrator is not comfortable with the automation provided by the OMP 420. As part of the initial configuring of the OMP 420, the extent to which the automatic checking change operation commands is permitted to occur and the types of operations performed in the event that a check fails is completely configurable. Thus, for example, in a legacy system that does not support change control, the automatic checking of change operation commands may be completely turned off. In environments where change control is supported, but the system administrator still wishes to have some control over the change operations performed, certain types of change operations may be specified in the configuration information for the OMP 420 indicating that these change operations are not to be subject to automatic change control but that messages should be sent to the system administrator for explicit authorization to go forward with the change operation. Other varying levels of control over the operation of the OMP 420 may be provided in a customizable manner via the configuration information in the OMP configuration data structure 440 and the OMP user interfaces 460.

Figure 5:
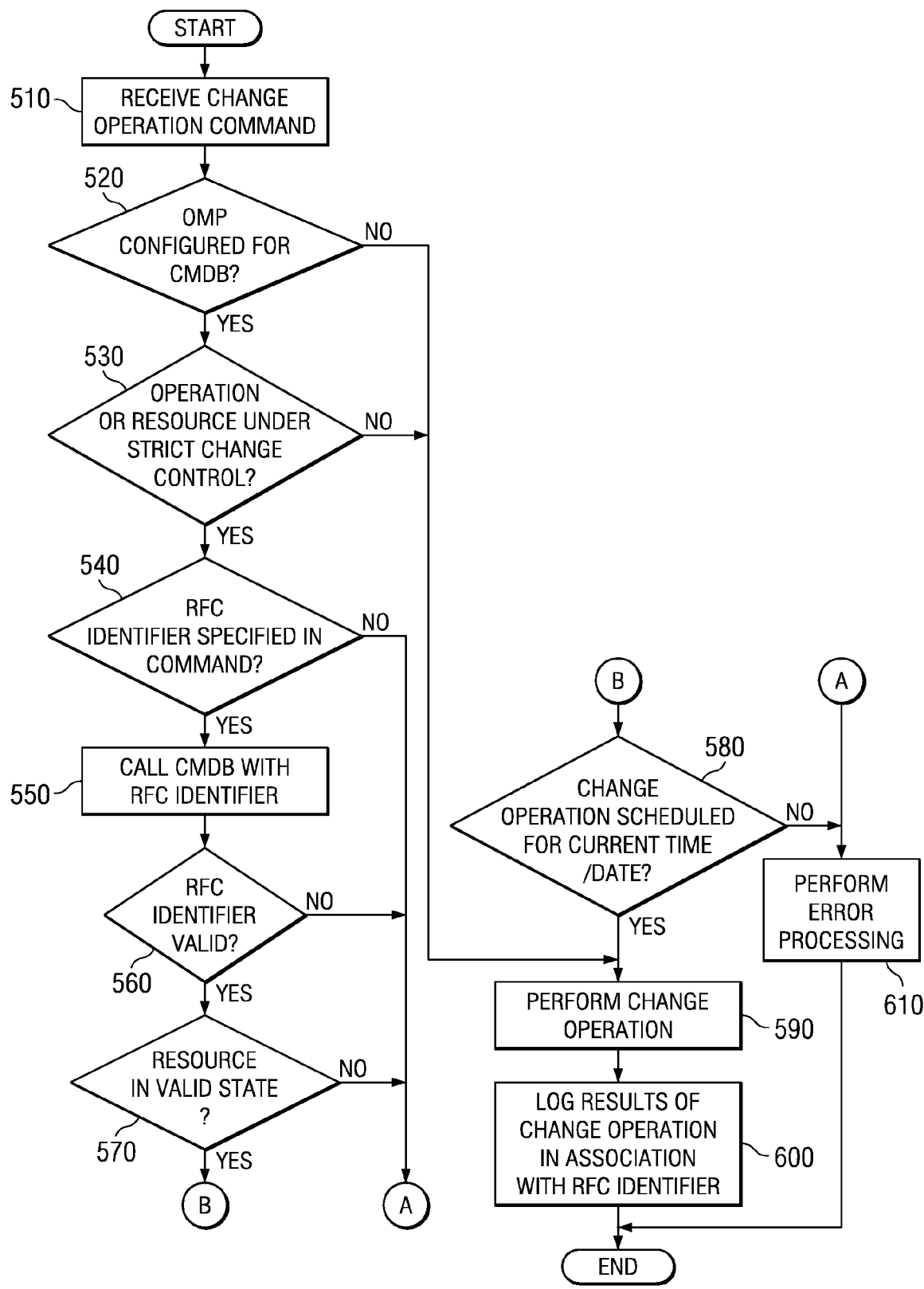
FIG. 5 is flowchart outlining an exemplary operation for performing automated change control management in accordance with one illustrative embodiment.

FIG. 5 is flowchart outlining an exemplary operation for performing automated change control management in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 5, the operation starts with the OMP receiving a change operation command (step 510). The OMP determines whether it is configured for access to a service management system (step 520). If so, the OMP determines if the operation or resource is subject to strict change control (step 530). If so, the OMP determines if a RFC identifier is specified in the change operation command (step 540).

If a RFC identifier is specified in the change operation command, then the OMP makes a call to the service management system with the RFC identifier to perform an RFC identifier validation (step 550). A determination is made as to whether the RFC identifier corresponds to an accepted RFC that is not completed or closed, i.e. the RFC is valid (step 560). If the RFC is valid, the OMP determines if the IT resource(s), subject to the change operation, is in a current state where the change operation may be performed (step 570).

If the IT resource(s) are in a current state where the change operation may be performed, the OMP determines if the schedule associated with the RFC permits the change operation to occur at the current time, date, etc. (step 580). If so, or if the OMP is not configured for service management system access (step 520), or the operation/resource is not under strict change control (step 530), then the change operation is permitted to be performed (step 590) and results of the change operation are logged in association with the RFC identifier (step 600). The operation then terminates.

If the RFC identifier checks (steps 540 and 560) the state check (step 570), or the schedule check (step 580) fail, then the OMP may execute an error processing (step 610) of the change operation command. This error processing may include, for example, failing the change operation, logging results of the failure, and returning appropriate messages indicating the failure. This error processing may alternatively include opening a new RFC for the change operation and returning a notification of the new RFC to the user. Moreover, the error processing may include proceeding with the change operation, i.e. going to step 590, but returning messages to appropriate personnel indicating the failure and the performance of the change operation. The particular error processing performed is dependent upon the particular implementation and the configuration specified for the OMP.

In the above description of the illustrative embodiments, an architecture similar to the IBM Service Management solution is assumed, however the illustrative embodiments are not limited to such. Rather, the mechanisms of the illustrative embodiments may be utilized in any infrastructure where RFCs, or the equivalent, and RFC checking may be used. Thus, while the illustrative embodiments are described in terms of OMPs, CMDBs, and the like, other elements that are functionally equivalent to these elements described herein may be utilized to provide the mechanisms for performing the operations of the illustrative embodiments without departing from the spirit and scope of the present invention.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computing system, for performing automated change control on one or more data processing system resources, comprising:
    receiving, in the computing system, a change operation command specifying an operation for changing a configuration of a resource in a data processing system;
    automatically determining, by the computing system, if one of the change operation or the resource is under strict change control;
    automatically performing, by the computing system, a request-for-change (RFC) validation check on the change operation command if the change operation or the resource is under strict change control; and
    automatically performing, by the computing system, a change operation corresponding to the change operation command to thereby change the configuration of the resource if results of the RFC validation check indicate that the change operation should be permitted, wherein the change operation command includes a RFC identifier for a RFC corresponding to the change operation command, and wherein automatically performing a RFC validation check comprises:
        automatically performing a lookup operation in a service management system based on the RFC identifier to identify the RFC in a database of the service management system;
        automatically determining if current conditions of resources of the data processing system meet requirements of the RFC, identified in the database by the RFC identifier, for performance of the change operation; and
    automatically performing error processing on the change operation command if the RFC validation check on the change operation command fails, wherein the error processing comprises one of:
        permitting the change operation to be performed and issuing at least one message to one or more data processing devices of the data processing system indicating the check failure and indicating that the change operation was permitted; or
        submitting an incident report, identifying a problem encountered, to a user and automatically performing a re-check of the RFC validation in response to the user responding with an input indicating the problem to be resolved.

2. The method of claim 1, wherein determining if current conditions meet requirements of the RFC for performance of the change operation comprises at least one of determining if a current date and time match a scheduled date and time associated with the RFC, or determining if a state of the data processing system is such that the resource may be modified by the change operation.

3. The method of claim 1, wherein automatically performing error processing on the change operation command comprises determining which error processing to perform based on the requested change operation and an identification of the resource.

4. The method of claim 1, wherein the error processing comprises:
    utilizing an interface to a process manager of the data processing system to automatically open a new RFC for the change operation; and
    sending a notification message to a data processing device of the data processing system indicating that the original change operation command could not be completed but that a new RFC was created for the change operation, wherein the notification message includes a new RFC identifier.

5. The method of claim 1, wherein automatically determining if one of the change operation or the resource is under strict change control comprises:
    obtaining configuration information for the data processing system from a configuration management database (CMDB), wherein the configuration information specifies at least one of which change operations or resources are under strict change control; and
    determining if one of the change operation or the resource is under strict change control based on the configuration information from the CMDB.

6. The method of claim 1, wherein the change operation is performed on a configuration item in a configuration management database, the configuration item representing the resource in the data processing system.

7. A computer program product comprising a non-transitory computer useable medium having a computer readable program, wherein the computer readable program, when executed on a computing device, causes the computing device to:
    receive a change operation command specifying an operation for changing a configuration of a resource in a data processing system;
    automatically determine if one of the change operation or the resource is under strict change control;
    automatically perform a request-for-change (RFC) validation check on the change operation command if the change operation or the resource is under strict change control;
    automatically perform a change operation corresponding to the change operation command to thereby change the configuration of the resource if results of the RFC validation check indicate that the change operation should be permitted, wherein the change operation command includes a RFC identifier for a RFC corresponding to the change operation command, and wherein automatically performing a RFC validation check comprises:
        automatically performing a lookup operation in a service management system based on the RFC identifier to identify the RFC in a database of the service management system; and automatically determining if current conditions of resources of the data processing system meet requirements of the RFC, identified in the database by the RFC identifier, for performance of the change operation; and automatically perform error processing on the change operation command if the RFC validation check on the change operation command fails, wherein the error processing comprises one of:

permitting the change operation to be performed and issuing at least one message to one or more data processing devices of the data processing system indicating the check failure and indicating that the change operation was permitted; or submitting an incident report, identifying a problem encountered, to a user and automatically performing a re-check of the RFC validation in response to the user responding with an input indicating the problem to be resolved.

8. The computer program product of claim 7, wherein the computer readable program causes the computing device to determine if current conditions meet requirements of the RFC for performance of the change operation by at least one of determining if a current date and time match a scheduled date and time associated with the RFC, or determining if a state of the data processing system is such that the resource may be modified by the change operation.

9. The computer program product of claim 7, wherein the computer readable program causes the computing device to automatically perform error processing on the change operation command by determining which error processing to perform based on the requested change operation and an identification of the resource.

10. The computer program product of claim 7, wherein the error processing comprises:

utilizing an interface to a process manager of the data processing system to automatically open a new RFC for the change operation; and sending a notification message to a data processing device of the data processing system indicating that the original change operation command could not be completed but that a new RFC was created for the change operation, wherein the notification message includes a new RFC identifier.

11. The computer program product of claim 7, wherein the computer readable program causes the computing device to automatically determine if one of the change operation or the resource is under strict change control by:

obtaining configuration information for the data processing system from a configuration management database (CMDB), wherein the configuration information specifies at least one of which change operations or resources are under strict change control; and determining if one of the change operation or the resource is under strict change control based on the configuration information from the CMDB.

12. A system, comprising:

a processor; and a memory coupled to the processor, wherein the memory comprises instructions which, when executed by the processor, cause the processor to:

receive a change operation command specifying an operation for changing a configuration of a resource in a data processing system;

automatically determine if one of the change operation or the resource is under strict change control;

automatically perform a request-for-change (RFC) validation check on the change operation command if the change operation or the resource is under strict change control;

automatically perform a change operation corresponding to the change operation command to thereby change the configuration of the resource if results of the RFC validation check indicate that the change operation should be permitted, wherein the change operation command includes a RFC identifier for a RFC corresponding to the change operation command, and wherein automatically performing a RFC validation check comprises:

automatically performing a lookup operation in a service management system based on the RFC identifier to identify the RFC in a database of the service management system; and automatically determining if current conditions of resources of the data processing system meet requirements of the RFC, identified in the database by the RFC identifier, for performance of the change operation; and automatically perform error processing on the change operation command if the RFC validation check on the change operation command fails, wherein the error processing comprises one of:

permitting the change operation to be performed and issuing at least one message to one or more data processing devices of the data processing system indicating the check failure and indicating that the change operation was permitted; or submitting an incident report, identifying a problem encountered, to a user and automatically performing a re-check of the RFC validation in response to the user responding with an input indicating the problem to be resolved.

\* \* \* \* \*